(12) United States Patent
Dudar et al.

(10) Patent No.: US 11,186,182 B2
(45) Date of Patent: Nov. 30, 2021

(54) VEHICLE POWER GENERATOR

(71) Applicant: Ford Global Technologies, LLC, Dearborn, MI (US)

(72) Inventors: Aed M. Dudar, Canton, MI (US); Thomas G. Leone, Ypsilanti, MI (US); Kenneth James Miller, Pinckney, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 395 days.

(21) Appl. No.: 16/132,941

(22) Filed: Sep. 17, 2018

(65) Prior Publication Data

US 2020/0086746 A1 Mar. 19, 2020

(51) Int. Cl.
*B60L 50/10* (2019.01)
*F02B 63/04* (2006.01)
*B60L 1/00* (2006.01)
*H02J 3/32* (2006.01)
*B60L 55/00* (2019.01)

(52) U.S. Cl.
CPC ............ *B60L 50/10* (2019.02); *F02B 63/048* (2013.01); *B60L 1/00* (2013.01); *B60L 55/00* (2019.02); *H02J 3/32* (2013.01)

(58) Field of Classification Search
CPC .......... B60L 53/62; B60L 50/10; B60L 1/006; B60L 55/00; Y02T 10/70; Y04S 10/126
USPC ............................................................ 123/2
See application file for complete search history.

(56) References Cited

U.S. PATENT DOCUMENTS

| 9,862,286 | B2 | 1/2018 | Mizuno | |
|---|---|---|---|---|
| 2008/0077286 | A1* | 3/2008 | Oyobe | B60W 10/08 701/22 |
| 2010/0079004 | A1* | 4/2010 | Keefe | B60L 53/65 307/80 |

FOREIGN PATENT DOCUMENTS

WO 2017209736 A1 12/2017

* cited by examiner

*Primary Examiner* — Lindsay M Low
*Assistant Examiner* — Omar Morales
(74) *Attorney, Agent, or Firm* — Gregory P. Brown; Brooks Kushman P.C.

(57) ABSTRACT

A vehicle includes a generator for supplying power to a load; and one or more controllers, programmed to responsive to detecting a fuel level reaching a predefined critical value, stop the generator and instruct a second vehicle to start to generate power, the vehicle serving as a pass-through conduit between the load and the second vehicle.

11 Claims, 3 Drawing Sheets

US 11,186,182 B2

VEHICLE POWER GENERATOR

TECHNICAL FIELD

The present disclosure is generally related to electrical power generation using vehicles. More specifically, the present disclosure is related to a power generation system involving multiple vehicles without interruption.

BACKGROUND

After natural disasters happen, such as hurricanes or earthquakes, portable electricity generators are usually needed in those affected areas due to damage to the power grid infrastructure caused by the natural disasters. Portable generators may be transported to the affected areas via vehicles such as pickup trucks or the like. Alternatively, a generator may be integrated with the vehicle. For instance, a vehicle may be driven to the affected area and may generate electric power using the vehicle engine by consuming conventional energy such as gasoline or diesel.

SUMMARY

In one or more illustrative embodiments of the present disclosure, a vehicle includes a generator for supplying power to a load; and one or more controllers, programmed to responsive to detecting a fuel level reaching a predefined critical value, stop the generator and instruct a second vehicle to start to generate power, the vehicle serving as a pass-through conduit between the load and the second vehicle.

In one or more illustrative embodiments of the present disclosure, a vehicle, connected to a load via a second vehicle in a daisy chain power cord configuration, includes a processor programmed to responsive to receiving a switchover signal from the second vehicle, start an engine to generate electric power to supply to the load using the power cord via the second vehicle.

In one or more illustrative embodiments of the present disclosure, a method for a vehicle includes generating electric power to a load; calculating a critical value for a fuel level based on a message received from a server wirelessly connected to the vehicle; responsive to detecting the fuel level has reached the critical value, send a switchover signal to a second vehicle; responsive to receiving a confirmation signal indicative of the second vehicle has successfully started to generate electric power, stop generating electric power, the vehicle serving as a pass-through power supply conduit between the second vehicle and the load.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, proposes a vehicle system for generating electric power. More specifically, the present disclosure proposes a system for generating continuous and uninterrupted power by using multiple vehicles connected in a daisy chain. The multiple vehicles may communicate with one another other via a vehicle-to-vehicle (V2V) network so that at least one vehicle is generating electric power at a given time.

Figure 1:
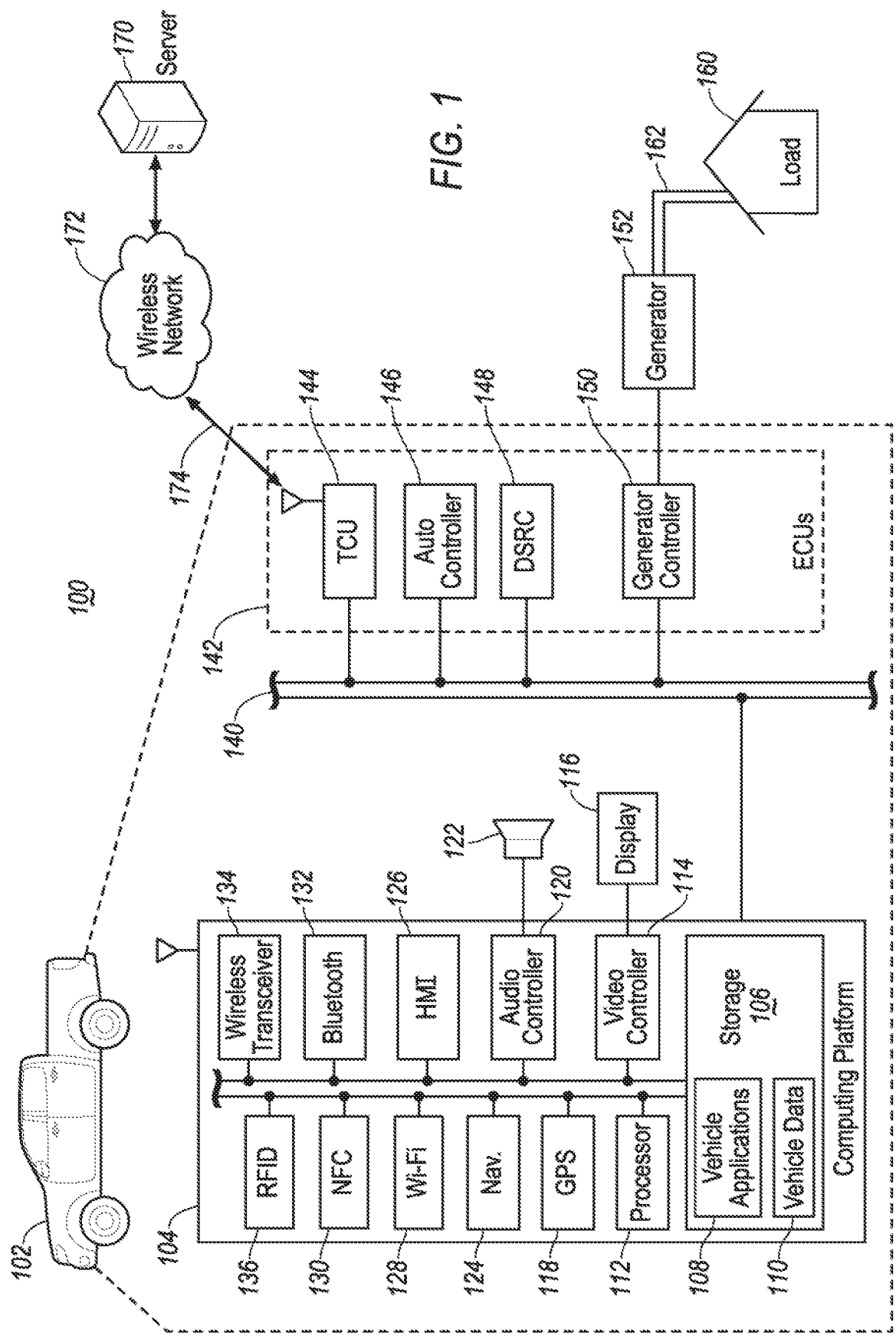
FIG. 1 illustrates an example block topology of a vehicle system of one embodiment of the present disclosure.

Referring to FIG. 1, an example block topology of a vehicle command authorization and authentication system 100 of one embodiment of the present disclosure is illustrated. The vehicle 102 may include various types of automobile, crossover utility vehicle (CUV), sport utility vehicle (SUV), truck, recreational vehicle (RV), shuttle bus, boat, plane, or other mobile machine for transporting people or goods. In many cases, the vehicle 102 may be powered by an electric motor. As another possibility, the vehicle 102 may be a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. As an example, the vehicle 102 may include the SYNC system manufactured by The Ford Motor Company of Dearborn, Mich.

As illustrated in FIG. 1, a computing platform 104 of the vehicle 102 may include one or more processors 112 configured to perform instructions, commands, and other routines in support of the processes described herein. For instance, the computing platform 104 may be configured to execute instructions of vehicle applications 108 to provide features such as navigation, vehicle communication and the like. Such instructions and other data may be maintained in a non-volatile manner using a variety of types of computer-readable storage medium 106. The computer-readable medium 106 (also referred to as a processor-readable medium or storage) includes any non-transitory medium (e.g., tangible medium) that participates in providing instructions or other data that may be read by the processor 112 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 126 configured to provide for occupant interaction with the vehicle 102. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 116 configured to provide visual output to vehicle occupants by way of a video controller 114. In some cases, the display 116 may be a touch screen further configured to receive user touch input via the video controller 114, while in other cases the display 116 may be a display only, without touch input capabilities. The computing platform 104 may also drive or otherwise communicate with one or more speakers 122 configured to provide audio output to vehicle occupants by way of an audio controller 120. The computing platform 104 may also be provided location features through location controller such as a global positioning system (GPS) controller 124 configured to communicate with multiple satellites to calculate the location of the vehicle 102. It is noted that the location controller may be configured to support other radio navigation systems used in various parts of the world, including GALILEO, GLONASS, and Beidou navigation satellite systems for instance. The computing platform 104 may be further provided with navigation features through a navigation controller 124 configured to calculate various routes using location data from the GPS controller 118 and map data stored in the storage 106 as a part of the vehicle data 110. Additionally or alternatively, the map data and live traffic data may be downloaded from a server in real-time as needed.

The computing platform 104 may be further provided with a wireless transceiver 134 in communication with a WiFi controller 128, a near-field communication (NFC) controller 130, a Bluetooth controller 132, a radio-frequency identification (RFID) controller 136 and other controllers such as a Zigbee transceiver, an IrDA transceiver (not shown), configured to communicate with compatible wireless transceivers of various devices. For instance, the wireless transceiver 134 may be configured to wirelessly communicate with a compatible wireless transceiver of another vehicle (not shown) via a wireless V2V connection.

The computing platform 104 may be further configured to communicate with various electronic control units (ECUs) 142 via one or more in-vehicle network 140. The in-vehicle network 140 may include, but is not limited to, one or more of a controller area network (CAN), an Ethernet network, and a media oriented system transport (MOST), as some examples.

The computing platform 104 may be in communication of multiple ECUs 142 configured to control and operate various functions of the vehicle 102. For instance, the ECUs 142 may include a telematics control unit (TCU) 144 configured to wirelessly connect to a remote server 170 via a wireless connection 174 through a wireless network 172. The ECUs 142 may further include an autonomous driving controller 146 in communication with various sensors (not shown), such as radar, Lidar, camera and the like, configured to operate the vehicle 102 in an autonomous manner responsive to receiving a command via the HMI controller 126 or from the remote server 170. The autonomous driver controller 146 may be configured to perform the autonomous driving using a route planned by the navigation controller 124 and location from the GPS controller 118. The ECUs 172 may further include a dedicated short-range communication (DSRC) controller 148 configured to communicate with compatible controllers of other entities (e.g. other vehicles 102) via a wireless connection.

The computing platform 104 may be further configured to communicate with a generator controller 150 configured to control a generator 152 for generating electric power to supply to a load 160 via an output power cord 162. The generator 152 may be configured to generate 110-120 V alternate current (AC) power which is commonly used in North America and some parts of Asia, or 220-240 V AC power commonly used in other parts of the world. The voltage ranges discussed here are merely examples and the generator 152 may be configured to generate any voltage power used by households, industries or military depending on the need of the load 160. The generator 152 may be further provided with a variable speed feature allowing the generator controller 150 to actively adjust the speed and output power based on input demand from the load 160. As an example, the generator 152 may be a conventional generator separated from the vehicle engine of the vehicle 102. Alternatively, the generator 152 may be fully or partially combined or integrated with vehicle engine of the vehicle 102 configured to generate electric power using conventional fuel such as gasoline, diesel, and/or nature gas. For instance, the vehicle engine of the vehicle 102 may be used as an electric generator in addition to being used to propel the motion of the vehicle 102. Such configuration may be particularly useful in cases that the vehicle 102 is a hybrid-electric vehicle powered by both combustion/compression engine and an electric motor. In case that the vehicle engine operates as the generator, the generator controller 150 may be integrated with a powertrain control module of the vehicle 102 configured to control the operation of the vehicle engine. Therefore, the term generator controller 150 used in the present disclosure is merely a general term and may refer to any controller, ECU, processor or the like configured to control the electric power generating operation of the vehicle 102.

Figure 2:
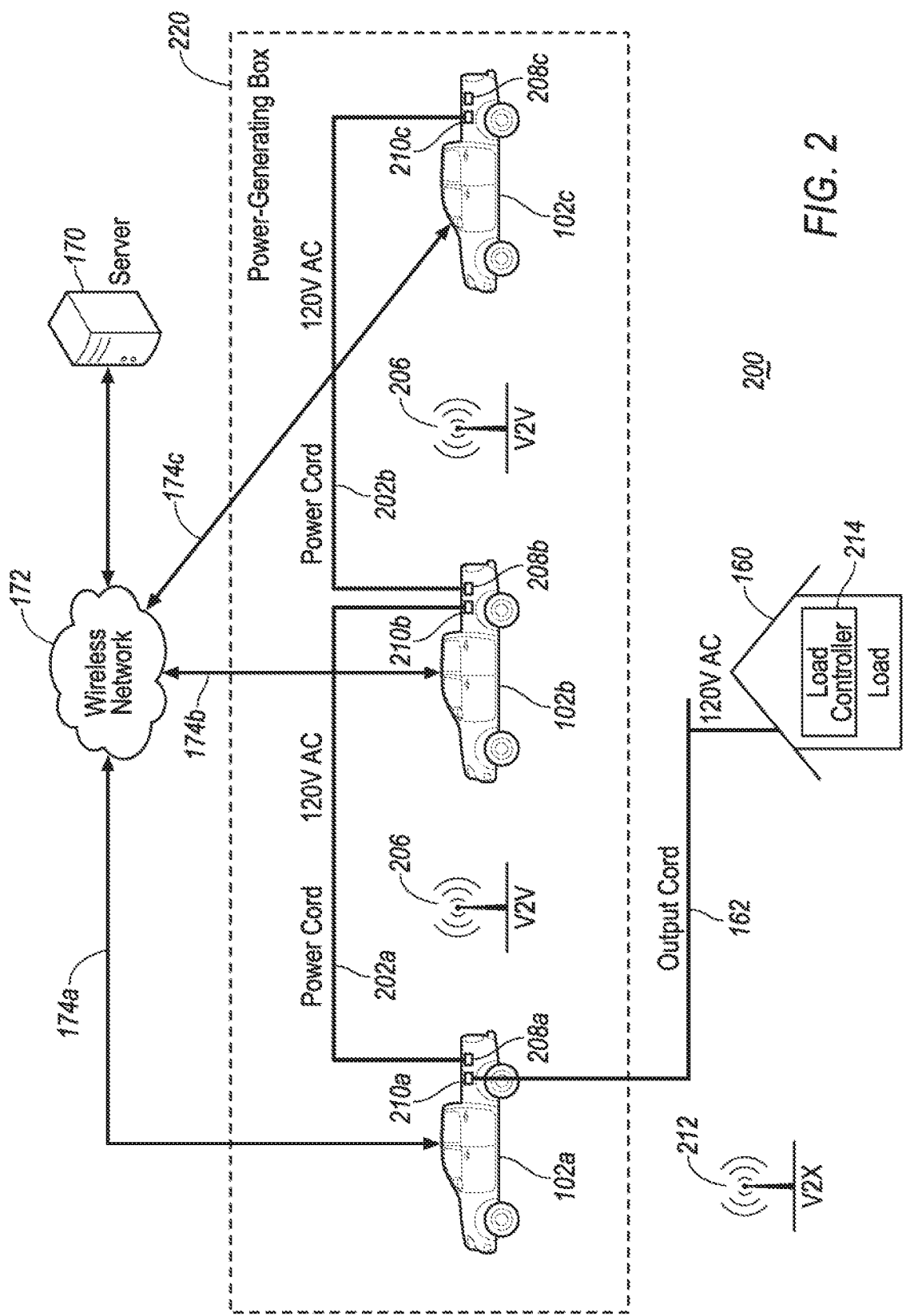
FIG. 2 illustrates an example diagram of the vehicle system of one embodiment of the present disclosure.

Referring to FIG. 2, an example diagram of the vehicle system 200 of one embodiment of the present disclosure is illustrated. With continuing reference to FIG. 1, three vehicles 102*a*, 102*b* and 102*c* are presented in the present example to generate electricity and supply power to the load 160. The three vehicles 102*a*, 102*b* and 102*c* are connected to the power load 160 in a daisy chain configuration via an input connector 208 and an output connector 210. The input connector 208 and output connector 210 may be located on the body of the vehicle 102 for easy access and of various present or future types of power receptacle used worldwide. Depending on the specific configuration, each vehicle 102 may be provided with one or more input and output connectors. Taking the example illustrated in FIG. 2 for instance, an output connector 210*a* of the first vehicle 102*a* is connected with the load 160 via the output power cord 162 and an input connector 208*a* of the first vehicle 102*a* is connected to an output connector 210*b* of the second vehicle 102*b* via a power cord 202*a*. For the second vehicle 102*b*, an input connector 208*b* is connected to an output connector 210*c* of the third vehicle 102*c* via a power cord 202*b*. Since the third vehicle 102*c* is the last vehicle in the daisy chain, an input connector 208*c* is not connected to any further vehicle. However, the daisy chain configuration may not be limited to a specific number of vehicles and may go on like this as needed. From the perspective of the load 160, the vehicles 102*a*, 102*b* and 102*c* connected in the daisy chain is treated as a single entity, namely a power-generating box 220 (thereinafter the box 220).

The vehicles 102*a*, 102*b* and 102*c* may be further configured to communicate with each other via a V2V connection 206. For instance, the V2V connection 206 may be a wireless connection involving various wireless technologies such as WiFi, NFC, Bluetooth, RFID, DSRC and the like, enabled via the wireless transceiver 134 and/or the DSRC controller 148. The vehicles 102*a*, 102*b* and 102*c* may be configured to wirelessly in communication with one another via the V2V connection 206. Alternatively, the V2V connection may be implemented in a daisy chain configuration. For instance, the second vehicle 102*b* is connected and relay information in-between the first vehicle 102*a* and the third vehicle 102*c*, as the first vehicle 102*a* and the third vehicle 102*c* are not directly connected to each other. The daisy chain configuration for the V2V connection 206 may be wired and implemented via the power cords 202 using power line communication (PLC) technology. Similarly, the box 220 may be in communication with the load 160 via a vehicle-to-everything (V2X) connection 212 using various wired or wireless technologies discussed above. Additionally, the box 220 may be further configured to connect to the wireless network 172 via the wireless connection 174 to communicate with a server 170 collectively or individually by each vehicle 102.

The operation of the vehicle system 200 may be applied to various situations. In one example, the vehicles 102*a*, 102*b* and 102*c* are connected in a daisy chain configuration with the first vehicle 102*a* directly connected to the load 160 as illustrated in FIG. 2. To conserve fuel and maximize power generating efficiency, the box 220 may be configured to have only one vehicle generating power at a time. For instance, after connecting the power cords 202 and output cord 162, the first vehicle 102*a* may start the generator 152 to generate electric power for the load 160, while the second vehicle 102*b* and the third vehicle 102*c* are in a stand-by mode in communication with the first vehicle 102*a* via the V2V connection 206. The generator controller 150 may be configured to constantly monitor the operation of the generator 152, as well as the vehicle fuel level of the first vehicle 102*a* based on a signal received from a fuel sensor (not shown). Responsive to detecting the fuel level reaching a predetermined critical condition, the generator controller 150 of the first vehicle 102*a* may send a switchover signal to the second vehicle 102*b*, which in response may switch on the generator to generate power. Then the first vehicle 102*a* may stop the generator 152 to conserve fuel while still acting as a pass-through conduit between the active power generating vehicle 102*b* and the load 160. Similarly, when the second vehicle 102*b* is low on fuel, the box switches over to the third vehicle 102*c* to generate power. And the process continues in such a manner as needed.

After the second vehicle 102*b* starts to generate power, the first vehicle 102*a* may be disconnected from the daisy chain of the box 220. A user may connect an additional output cord to an additional output connector of the second vehicle 102*b* to connect the second vehicle 102*b* directly to the load 160, and disconnect the existing output cord 162 and power cord 202*a* from the first vehicle 102*a*. After disconnected from the box 220, the first vehicle 102*a* may be driven to a fueling station to refuel, and may return and rejoin the box 220 after the third vehicle 102*c*. In this way, a continuous and uninterrupted power supply chain may be provided.

The load 160 may be provided with communication capabilities via a load controller 214 configured to communicate with the generator controller 150 of the current power generating vehicle 102 of the box 220 and monitor the power supply. In case that the generator 152 is provided with a variable speed feature, the generator controller 150 may be further configured to adjust the speed and output power of the generator 152 based on a load demand signal received from the load controller 214 to improve the generating efficiency by providing an "on-demand" power feature. The generator controller 150 may be further configured to connected to a wireless network 172 via the wireless connection 174 to communicate with the server 170. The server 170 may provide various useful information to the box 220. For instance, the server 170 may actively provide information about the nearest available fueling station, such as location and opening hours, allowing the generator controller 150 to calculate the amount of fuel and time needed to drive to the fueling station, so as to determine the critical fuel level at which to shut down the generator 152. Additionally, the generator controller 150 may further receive information such as weather forecast, estimated power restoration time for the load 160 provided by the utility company, traffic and route condition from the server 170. In case that the vehicle 102 is provided with autonomous driver features, the autonomous controller 146 may be configured to automatically operate the vehicle 102 to a selected fueling station based on commands and data received from the server 170, responsive to detecting the fuel level has reached the critical condition and the power cords 202 and 162 have been disconnected.

Figure 3:
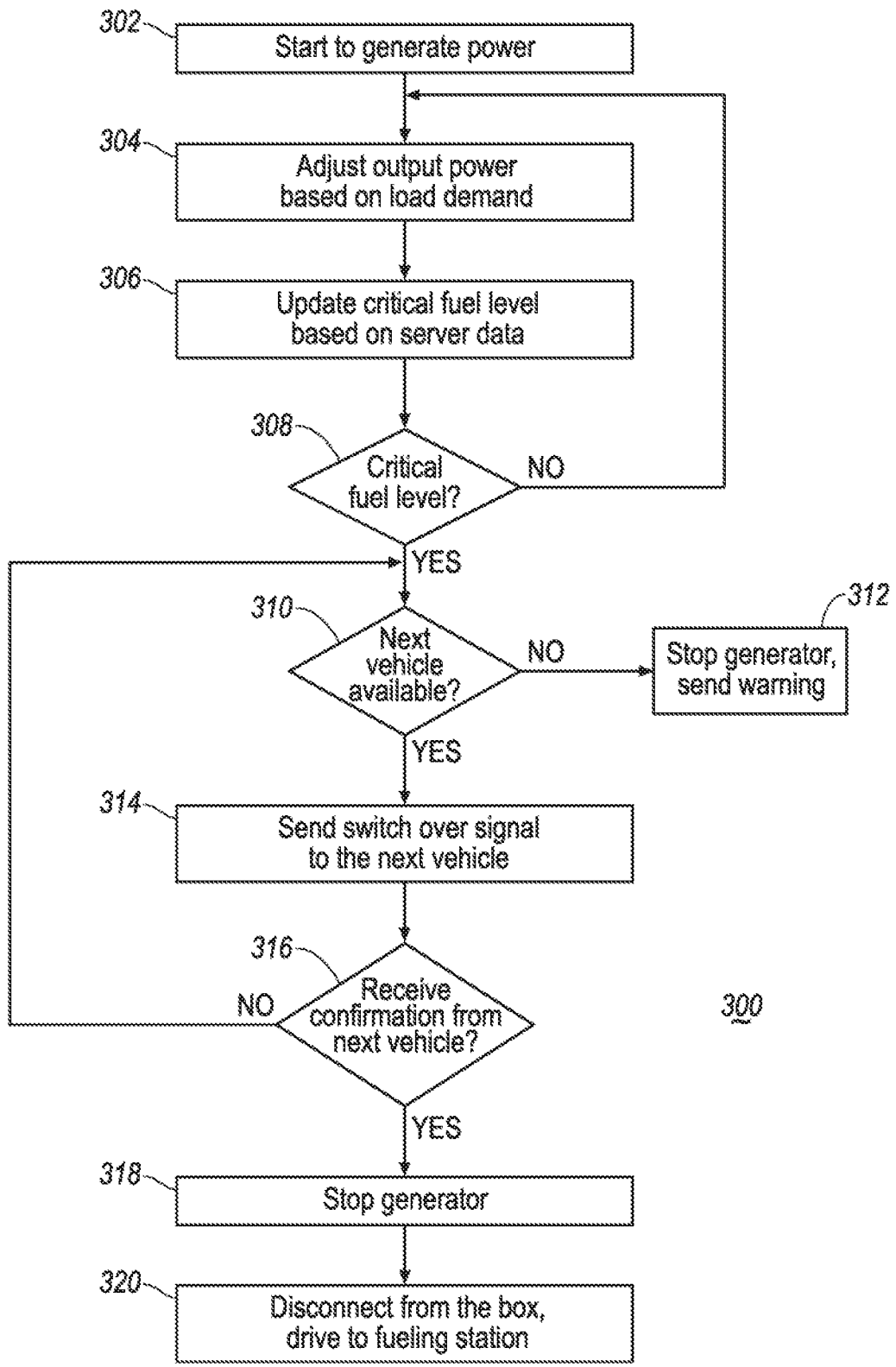
FIG. 3 illustrates a flow diagram of the vehicle system of one embodiment of the present disclosure.

Referring to FIG. 3, a flow diagram of a process 300 for the vehicle system of one embodiment of the present disclosure is illustrated. With continuing reference to FIGS. 1 and 2, the process 300 will be described referring to the first vehicle 102*a*, although the same process may be performed on other vehicles. At operation 302, the generator controller 150 of the first vehicle 102*a* starts the generator 152, responsive to receiving a command input via the HMI 126 by a user. Additionally or alternatively, the generator controller 150 may receive the command to start from the server 170 transmitted via the wireless network 172. Responsive to receiving a load demand signal from the load 160 via the V2X connection 212, at operation 304, the generator controller 150 adjusts the speed and output power of the generator 152 to obtain the best possible generating efficiency.

The generator controller 150 continues to communicate with the remote server 170 and receives data and information therefrom. Some example of the data received from the remote server 170 may include information about the nearest available fueling station. At operation 306, the generator controller 150 calculates and updates the critical fuel level at which point the generator 152 should stop, leaving enough fuel for the vehicle 102*a* to drive to the fueling station. The generator controller 150 may be provided with a default critical fuel level. For instance, the default critical fuel level may be 2 U.S. gallons (about 7.57 liters) which allows to vehicle 102*a* to drive approximately 30 miles with 15 miles-per-gallon (MPG). However, responsive to receiving information from the server 170 indicating the nearest available fueling station is about 60 miles away from the current location of the vehicle 102a determined by the GPS controller 118, the generator controller 150 may re-calculate the amount of fuel needed to drive to that fueling station and overwrite the default level. Following the example discussed above, in this case, the generator controller 150 may calculate and determine it takes about 4 U.S. gallon (i.e. 60 miles/15 MPG) to reach the nearest fueling station. Therefore, the generator controller 150 updates the critical fuel level from the default 2 gallons to 4 gallons.

The generator controller 150 continues to monitor the fuel level of the vehicle 102a and checks whether the fuel level has reached the critical fuel level at operation 308. If the critical fuel level has not been reached yet, the process returns to operation 304 and the generator controller 150 repeats the process. Otherwise, responsive to detecting the critical fuel level has been reached, the process proceeds to operation 310 and the generator controller 150 checks if there is an available next vehicle 102 connected ready to start to generate electric power. This operation may be performed using the V2V connection 206 between the vehicles 102. If the vehicle 102a is the last vehicle and no further vehicles 102 are connected in the daisy chain, the process 300 proceeds to operation 312 and the generator controller 150 stops the generator and sends a warning to the server 170. Otherwise, referring to FIG. 2, responsive to the generator controller 150 detecting the second vehicle 102b is connected and in stand-by mode ready to start via the V2V connection 206, the process proceeds to operation 314. The generator controller 150 sends a switchover signal to the next available vehicle 102b instructing to start to generate electric power. At operation 316, the generator controller 150 waits for a confirmation signal from the next available vehicle 102b informing a successful switching over. If no confirmation signal is received within a predefined time (e.g. 30 seconds), suggesting the second vehicle 102b although connected, is unable to start to generate electric power, the process returns to operation 310 and the generator controller 150 checks whether there is a next available vehicle after the second vehicle 102b. Referring to FIG. 2, the responsive to detecting the third vehicle 102c is connected, the generator controller 150 repeats operation 314 and 316 for the third vehicle 102c. The process may go on like as needed in case that more vehicles are connected.

Responsive to receiving a confirmation signal from the next available vehicle 102b at operation 316, the process proceeds to operation 318 and the generator controller 150 controls the generator 152 to stop. While still connected in the daisy chain, the vehicle 102a acts as a pass-through conduit between the active power generating vehicle 102b and the load 160, until it is disconnected from the chain at operation 320. Responsive to detecting being the power cord 202 and output cord have been disconnected, the vehicle 102a may be driving to the fuel station by a user. Alternatively, the computing platform 104 may operator the vehicle 102a to automatically drive to the predetermined fueling station via the autonomous driving controller 146.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
   a generator for supplying power to a load; and
   one or more controllers, programmed to
     responsive to detecting a fuel level reaching a predefined critical value, instruct a second vehicle to start to generate power,
     responsive to receiving a confirmation signal from the second vehicle indicative of the second vehicle having successfully started to generate power, stop the generator such that the vehicle serves as a pass-through conduit between the load and the second vehicle,
     responsive to failing to receive the confirmation signal from the second vehicle within a predefined time period, send a switchover signal to a third vehicle to instruct the third vehicle to start to generate power, wherein the third vehicle is connected to the vehicle via the second vehicle via a power cord.

2. The vehicle of claim 1, wherein the one or more controllers are further programmed to, responsive to receiving a message from a server wirelessly connected to the vehicle, update the critical value based on the message.

3. The vehicle of claim 2, wherein the message received from the server includes at least one of: information about the nearest available fueling station, information about local area traffic condition, information about a weather forecast, or estimated power restoration time for the load.

4. The vehicle of claim 1, wherein the one or more controllers are further programmed to, responsive to receiving a signal from the load indicative of a power demanded by the load, adjust a generator output power to adapt to the demanded power.

5. The vehicle of claim 1, wherein the one or more controllers are further programmed to communicate with the second vehicle via a wireless connection.

6. The vehicle of claim 5, wherein the wireless connection includes at least one of the following technologies: WiFi, dedicated short-range communication (DSRC), Bluetooth, radio-frequency identification (RFID), and near-field communication (NFC).

7. The vehicle of claim 1, wherein the one or more controllers are further programmed to communicate with the second vehicle via a wired connection.

8. The vehicle of claim 7, wherein the wired connection includes a powerline communication (PLC) connected via a power cord serving as the pass-through conduit between the load and the second vehicle.

9. The vehicle of claim 1, wherein the one or more controllers are further programmed to, responsive to disconnecting from the load and from the second vehicle, automatically operate the vehicle to a predefined location.

10. A vehicle, connected to a load via a second vehicle in a daisy chain power cord configuration, comprising:
    a processor, programmed to
      responsive to receiving a switchover signal from the second vehicle, start an engine to generate electric power to supply to the load using the power cord via the second vehicle,
      responsive to detecting a third vehicle being connected to a power input connector of the vehicle, establish a vehicle-to-vehicle (V2V) communication to the third vehicle, calculate a critical value for a fuel level based on information received from a server, and responsive to detecting the fuel level reaching the critical value, instruct the third vehicle to start to generate power and stop the engine, the second vehicle serving as a pass-through conduit between the load and the third vehicle.

11. The vehicle of claim 10, wherein the processor is further programmed to, responsive to detecting a disconnection of the power cord, automatically operate the vehicle to a location received from the server.

\* \* \* \* \*